United States Patent [19]

Farmer et al.

[11] 4,307,541
[45] Dec. 29, 1981

[54] TAIL-GATE OPERATING AND LOCKING MECHANISM

[75] Inventors: Charles F. Farmer, Knoxville, Tenn.; Michael N. Copeland, Seattle, Wash.

[73] Assignee: Dempster Systems Inc., Knoxville, Tenn.

[21] Appl. No.: 99,065

[22] Filed: Nov. 30, 1979

[51] Int. Cl.³ .............................................. E05F 15/04
[52] U.S. Cl. ........................................ 49/280; 296/56; 298/235
[58] Field of Search .......................... 49/280, 340, 334; 298/23 MD, 23 M, 23 S; 296/56

[56] References Cited

U.S. PATENT DOCUMENTS

| | | | |
|---|---|---|---|
| 2,538,980 | 1/1951 | Payne, Jr. .............................. | 49/280 |
| 3,272,552 | 9/1966 | Park ..................................... | 49/280 X |
| 3,305,263 | 2/1967 | Appleman ............................. | 296/56 |
| 3,440,763 | 4/1969 | O'Brien ................................ | 49/280 |
| 3,860,288 | 1/1975 | Martin et al. ........................ | 49/280 X |

*Primary Examiner*—Kenneth Downey
*Attorney, Agent, or Firm*—Jacox & Meckstroth

[57] ABSTRACT

Tail-gate operating and locking apparatus for tail-gates utilized in refuse handling vehicles. The apparatus includes hydraulically operated means with a piston rod pivotally connected to the tail-gate and a cylinder pivotally connected to a latch mechanism for locking the tail-gate on the vehicle body. The latch mechanism comprises a bell-crank pivotally connected to the hydraulic cylinder and a locking element pivotally connected to the bell-crank and having a latching pin adapted to engage a hook secured to the tail-gate in a closed position thereof. A ramp element is rigidly attached to the vehicle body. The ramp element is provided with a cam surface to guide the latching pin during its reciprocating movement from and into engagement with the hook.

7 Claims, 2 Drawing Figures

TAIL-GATE OPERATING AND LOCKING MECHANISM

BACKGROUND OF THE INVENTION

Field of the Invention

This invention relates to a mechanism for operating and locking the tail or end gate of refuse handling vehicles and more particularly, to an automatic device for swinging the tail-gate to open and closed positions and automatically latching the tail-gate in its closed position.

In refuse vehicles of the type wherein refuse is compacted in the body of the vehicle and ejected or dumped through the rear of the vehicle, the rear wall, or tail-gate, must be of the full opening type. The tail-gate is normally pivoted at the top and covers the entire rear wall of the vehicle body. The weight of the tail-gate holds the tail-gate in a normally closed position, however, it is necessary to lock or secure the tail-gate in the closed position when the vehicle is being operated. In addition, it is desirable to pull the tail-gate into a locked position against a resilient gasket or other sealing means. The tail-gate is normally opened by the vehicle operator manually releasing the lock at the rear of the vehicle and then actuating the operating mechanism of hydraulic cylinders mounted on the side of the vehicle with one end in contact with the tail-gate. The hydraulic cylinders extend and swing the tail-gate upwards about the top pivot points. To relieve the operator of the need to leave the cab or the vehicle in order to release the locking mechanism, hydraulic cylinders which utilize the first few inches of motion to release the lock have been used. These devices, however, do not normally pull the tail-gate into the locked position to provide a seal between the body and the tail-gate.

SUMMARY OF THE INVENTION

An object of this invention is to provide a locking device for a truck tail-gate having a common operating member for swinging the tail-gate and latching the same.

Another object of this invention is to provide a combined latching and tail-gate operating mechanism, which is fully automatic both in opening the latch and elevating the tail-gate, and in pulling the tail-gate against the body of the vehicle and locking the tail-gate in a closed position.

A further object of this invention is to provide a combined latching and tail-gate operating mechanism, which insures the opening of the latch prior to the opening movement of the tail-gate.

These objects are accomplished according to the present invention, by a latching element, operatively connected to hydraulic cylinder actuating means, which is provided with a latching pin at one end thereof to engage a hook member rigidly attached to the tail-gate for locking the tail-gate. The mechanism includes a ramp element having a cam surface, which engages the latching pin of the latching element after the latching pin is released from the hook for opening the tail-gate. The cam surface is terminated with a slot to retain the latching pin during the opening operation. The latching pin is cammed upwards and inwards during the locking operation to engage the hook member and draw the tail-gate against the vehicle body.

DESCRIPTION OF THE PREFERRED EMBODIMENT

Figure 1:
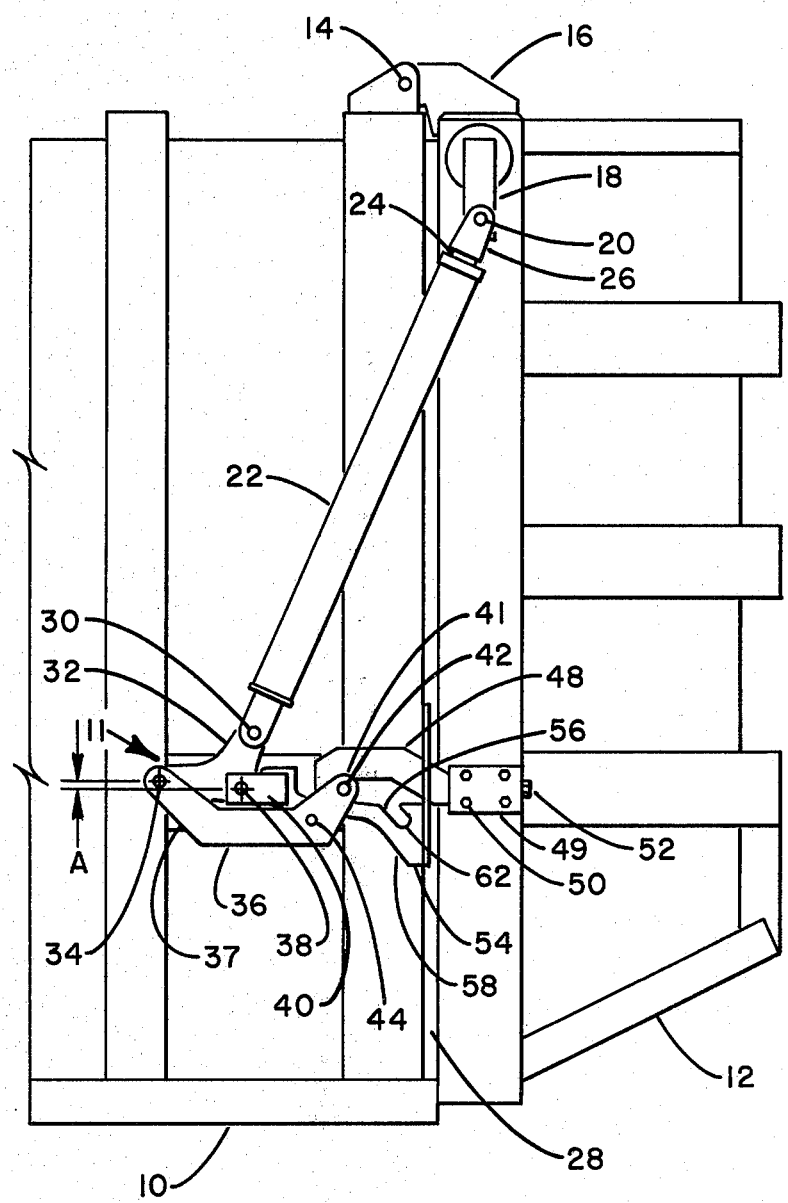
FIG. 1 is a side elevational view of the combined tail-gate operating and latching device shown in its closed and latched position.

Referring to the drawings, a portion of a truck body 10 is shown with an end loading opening enclosed by a tail-gate or door 12 hinged at opposite upper corners of the truck body. Identical tail-gate operating and latching devices 11 are mounted on opposite sides of the truck body 10, however, only one of such mechanisms is illustrated in the drawings. As can be seen in FIG. 1, tail-gate 12 is pivotally mounted on the truck body at point 14. A gasket seal 28 formed of suitable sealing material is arranged to extend along the edges of the end opening to seal the tail-gate in its closed position. A hinge member 16 secured to the upper edge of the tail-gate 12 is pivotally mounted at pin 14 and secured to the top of the tail-gate. The door operating mechanism comprises a hydraulic cylinder element 22 having a piston rod 24. The cylinder and the piston elements are provided with suitable hydraulic fluid lines in a normal manner to move the piston rod into and out of the cylinder. The upper end of the piston 24 is formed with an integral boss 26, which is pivotally attached by a pin 20 at the tail gate 12. The lower end of the cylinder 22 is connected to one arm of a bell-crank 32 by means of a pivot pin 30 carried at one end of the bell-crank. The bell-crank is pivotally mounted at a pivot 38 on a supporting element 40 rigidly connected to the truck body 10. The other arm of the bell-crank 32 is pivotally connected to a latch 36 by means of a pivot pin 34. The latch 36 comprises an elongated member having an upwardly extending portion 37 on one end with an aperture to receive the pin 34. An upwardly and laterally projecting portion 41 is located at the opposite end of the latch 36 and has an opening adapted to receive a latching pin 42 therein. Portion 41 has a guide pin 44 mounted thereon and spaced from latching pin 42.

A hook element 48 is rigidly mounted on the swingable tail-gate 12 by means of supporting brackets 49 and bolts 50 or by any other conventional fasten means in the hook assembly. Hook element 48 may be adjusted by means of a bolt 52. Bolt 52 may be threaded or otherwise connected to the body of the hook element to move hook element 48 toward and rearward of the truck body in order to tighten the engagement of the hook element with the latching pin 42 when the latching operation is completed. A guide 54 is rigidly mounted on the truck body 10 and is formed with a cam surface 56. The cam surface 56 terminates in a slot 62 sized to engage the latching pin 42. The guide 54 is provided with a second cam surface 58 formed on its lower side to provide a guide for the reciprocating movement of guide pin 44 during unlatching and latching operations. Hook element 48 is formed with a downwardly projecting lug 51. In the locking position the latching pin 42 engages the inner surface of the lug 51 to retain the tail-gate in the locked position.

When the tail-gate is closed, there is an over-center relationship between pin 34, pivot point 38 and latching pin 42. The over-center clearance is marked as "A" in FIG. 1 and is shown between the point through the pin 34, and the line drawn between the center of the pin 38, about which the bell-crank 32 pivots, and the axis of latching pin 42 in a position when the tail-gate is closed. The over-center arrangement in a locking position of the tail-gate will be explained in detail below.

Figure 2:
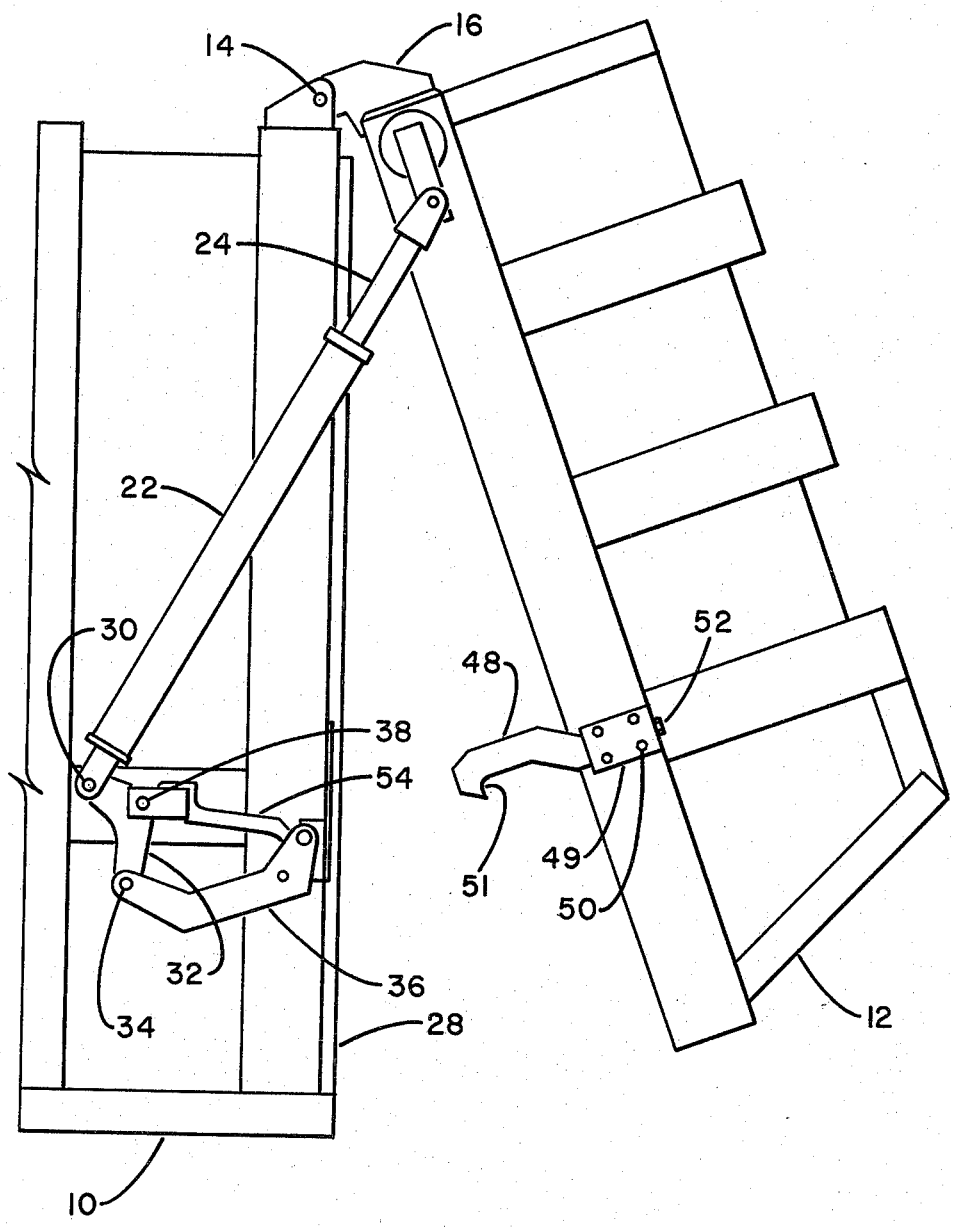
FIG. 2 is a side elevational view of the tail-gate operating and latching device with the tail-gate unlocked and in a partially open position.

In operation, to move the tail-gate from a closed position as shown in FIG. 1 to an open position, hydraulic fluid is supplied to double acting cylinder 22. As the cylinder 22 is moved downwardly by the pressure of the hydraulic fluid, the bell-crank 32 which is pivotally connected to the lower end of the cylinder by the pin 30, rotates in counterclockwise direction about pin 38 as seen in FIG. 1, to the position shown in FIG. 2. Rotation of the bell-crank will move the latch 36 in a downward direction, thus permitting its laterally projecting portion 41 and latching pin 42 to move downward along the ramp 54 away from hook 48. As can be seen in FIG. 2, the initial movement of the cylinder 22 and the rotational movement of bell-crank 32 causes the latching pin 42 to move downwardly toward the right to engage the cam surface 56 of the ramp 54. At this time, guide pin 44 is moved relative to the cam surface 58 formed on the lower side of the ramp. Latching pin 42 and pin 44 disposed in a spaced relation provide a reliable guide for translative movement of latching pin 42 within the slot 62. When latching pin 42 engages the lower edge of the slot 62, the unlatching operation is completed. Continued extension of cylinder 22 causes the piston 24 to move upwardly to cause the tail-gate to swing upwardly into its open position.

To move the tail-gate from an open position to a closed position the fluid pressure is released from the cylinder 22 and the piston 24 moves downwardly under the weight of the door 12. When the tail-gate is in the full downward position, hydraulic fluid is admitted into the cylinder to move the cylinder 22 upwardly causing the bell-crank 32 to rotate about the pin 38. The pin 34, which connects the bell-crank 32 to the latch 36 rotates in the clockwise direction causing the latching pin 42 to move upward out of slot 62 of the ramp 54 until the latching pin engages the hook lug 51. The latching pin 42 pulls the hook 48 to the left, as seen in FIG. 1, drawing the tail-gate 12 against the sealing member 28.

When the closing motion is completed, the point 34 is located over-center of pin 38 and latching pin 42. The over-center arrangement provides a sufficient force acting on the latch to retain the door in the closed position against the force of the sealing member 28 and the forces from compacting material in the body.

The latching device thus described will reach and pull the tail-gate to a closed position even if prior to locking, the tail-gate is not completely closed.

While this invention has been illustrated in accordance with a preferred embodiment, it is recognized that variations and changes may be therein without departing from the scope of the invention as set forth in the claims.

We claim:

1. A tail-gate operating and locking apparatus for use on refuse vehicles of the type having a rear tail-gate pivoted at the top for movement between a closed position and an open position, including, a bell-crank mounted on the vehicle body for rotation about a fixed point,
   a hydraulic cylinder pivotally attached at one end to the vehicle tail-gate and the other end to the bell-crank,
   a guide secured to the vehicle body having a cam surface and a downwardly extending slot,
   a latch pivotally secured at one end to the bell-crank and having a latching pin at the opposite end, the latching pin being positioned to move into and out of the slot and along the cam surface of the guide,
   a hook secured to the tail-gate in a position to be engaged by the latching pin when the tail-gate is in the closed position,
   said bell-crank being rotatable by extension of the hydraulic cylinder to move the latching pin down the cam surface into the slot out of interference relation with the hook whereby continual movement of the hydraulic cylinder moves the tail-gate to the open position, and by retraction of the hydraulic cylinder to move the latching pin out of the slot and along the cam surface into engagement with the hook to draw the tail-gate toward the vehicle body.

2. The tail-gate operating and locking apparatus of claim 1 wherein the bell-crank is movable to an over-center position to hold the latching pin in engagement with the hook to lock the hook and tail-gate in a closed position.

3. A tail-gate operating and locking apparatus for use on a refuse vehicle body of the type having a rear tail-gate pivoted at the top for movement between a closed and an open position comprising:

means to support the tail-gate on the vehicle body for pivotal movement from an open to a closed position,
   hydraulic actuating means to provide pivotal movement of the tail-gate,
   said actuating means having a piston pivotally mounted on the upper portion of the tail-gate and a cylinder extending downwardly from said piston,
   a hook element secured to the tail-gate,
   latch means for locking the lower edge of the tail-gate,
   said latch means including
   a bell-crank pivotally supported upon the vehicle body and pivotally connected to said cylinder,
   a locking element pivotally connected to said bell-crank at its one end and having a latching pin at its opposite end adapted to engage said hook element in the latched position,
   a ramp element secured to the vehicle body and having a cam surface, said cam surface being terminated with a slot, said bell-crank being rotatable by extension of the hydraulic cylinder to move the latching pin down along said cam surface into said slot out of interference relation with the hook whereby continual movement of the hydraulic cylinder moves the tail-gate to the open position, and by retraction of the hydraulic cylinder to move the latching pin out of the slot and along the cam surface into engagement with the hook to draw the tail-gate toward the vehicle body,
   said locking element having a guide pin disposed in spaced relationship with said latching pin and said ramp element being provided with a second cam surface on its lower side to engage said drive pin during the movement of said latching pin into and out of said slot.

4. A tail-gate operating and locking apparatus for use on a refuse vehicle body of the type having a rear tail-gate pivoted at the top portion thereof for movement between a closed position and an open position, including, a bell-crank mounted on the vehicle body for pivotal movement about a fixed axis,
  a linearly operable hydraulic motor having a portion pivotally attached to the bell-crank for pivotal movement thereof, and means attaching a portion of the hydraulic motor to the tail-gate for pivotal movement thereof,
  a guide member secured to the vehicle body, the guide member being provided with an angularly extending cam surface having a first portion at one end thereof and a second portion at the opposite end thereof,
  a latch member having spaced-apart portions, one portion of the latch member being pivotally attached to the bell-crank, a latching pin attached to the opposite portion of the latch member, the latching pin being movable along the cam surface of the guide member between the first portion thereof and the second portion thereof with pivotal movement of the bell-crank,
  a hook member secured to the tail-gate, the hook member being positioned adjacent the cam surface of the guide member when the tail-gate is pivotally positioned adjacent its closed position, the latching pin being free from engagement with the hook member when the latching pin is positioned adjacent the second portion of the cam surface of the guide member,
  the linearly movable hydraulic motor being operable in a first direction to pivotally move the bell-crank to move the latch member and the latching pin thereof from the second portion of the cam surface to the first portion of the cam surface, the latching pin engaging the hook member and drawing the tail-gate toward closed position as the latching pin moves from the second portion of the cam surface of the guide member toward the first portion of the cam surface of the guide member,
  the bell-crank being pivotally movable by operation of the linearly operable hydraulic motor in a second direction to move the latch member and the latching pin thereof from the first portion of the cam surface toward the second portion of the cam surface to move the latching pin out of engagement with the hook member, continued operation of the hydraulic motor in said second direction moving the tail-gate to the open position.

5. The tail-gate operating and locking apparatus of claim 4 in which the second portion of the cam surface has an abutment portion for engagement by the latching pin for positioning thereof at the second portion of the cam surface.

6. A tail-gate operating and locking apparatus for use on a refuse vehicle body of the type having a tail-gate pivotally movable between a closed position and an open position, comprising:

a crank mounted on the vehicle body for pivotal movement about a fixed axis,
  a guide member secured to the vehicle body, the guide member being provided with a cam surface which has a first portion and a second portion, the second portion of the cam surface being angular with respect to the first portion,
  a movable latch member having a pivot portion pivotally joined to the crank and having a latching portion spaced from the pivot portion, the latch member being movable with pivotal movement of the crank, the latching portion being movable along the cam surface with pivotal movement of the crank and with movement of the latch member,
  a hook member secured to the tail-gate for movement therewith, the tail-gate being pivotally movable toward closed position to position the hook member adjacent the cam surface, the latching portion of the latch member being positioned at the second portion of the cam surface and in spaced relationship from the hook member as the tail-gate moves toward its closed position, the latching portion of the latch member being movable along the cam surface from the second portion thereof toward the first portion thereof to engage the hook member and to draw the tail-gate to closed position with pivotal movement of the crank and with movement of the latch member,
  motor means joined to the crank and to the tail-gate for pivotal movement thereof.

7. A tail-gate operating and locking apparatus for use on a refuse vehicle body of the type having a tail-gate pivotally movable between a closed position and an open position comprising:

a crank mounted on the vehicle body for pivotal movement about a fixed axis,
  a guide member secured to the vehicle body, the guide member being provided with a cam surface which has a first portion and a second portion, the second portion of the cam surface being angular with respect to the first portion of the cam surface, the guide member also having a guide surface,
  a pivotally movable latch member having a pivot portion pivotally joined to the crank and having a latching portion and a guide portion, the latching portion being movable along the cam surface and the guide portion being movable along the guide surface with pivotal movement of the latch member and with pivotal movement of the crank,
  a hook member secured to the tail-gate for movement therewith, the tail-gate being pivotally movable toward closed position to position the hook member adjacent the cam surface, the latching portion of the latch member being positioned at the second portion of the cam surface and in spaced relationship from the hook member as the tail-gate moves toward closed position, the latching portion of the latch member being movable along the cam surface from the second portion thereof toward the first portion thereof to engage the hook member and to draw the tail-gate to closed position with pivotal movement of the crank and with pivotal movement of the latch member,
  motor means joined to the crank and to the tail-gate for pivotal movement thereof.

* * * * *